United States Patent [19]

Futhey et al.

[11] Patent Number: 4,830,481
[45] Date of Patent: May 16, 1989

[54] MULTIFOCAL DIFFRACTIVE LENS

[75] Inventors: John A. Futhey, Petaluma, Calif.; William B. Isaacson, Hudson, Wis.; Ricky L. Neby, Plymouth, Minn.

[73] Assignee: Minnesota Mining and Manufacturing Company, St. Paul, Minn.

[21] Appl. No.: 231,866

[22] Filed: Aug. 12, 1988

[51] Int. Cl.$^4$ .......................... G02C 7/04; G02B 5/18; A61F 2/14; A61F 2/16
[52] U.S. Cl. .................. 351/161; 350/162.22; 623/4; 623/5; 623/6
[58] Field of Search ............... 351/160 R, 160 H, 161, 351/162, 168; 623/4, 5, 6; 350/162.22

[56] References Cited

U.S. PATENT DOCUMENTS

| | | |
|---|---|---|
| 4,162,122 | 7/1979 | Cohen .................. 351/161 |
| 4,210,391 | 7/1980 | Cohen .................. 351/161 |
| 4,338,005 | 7/1982 | Cohen .................. 351/161 |
| 4,340,283 | 7/1982 | Cohen .................. 351/161 |
| 4,704,016 | 11/1987 | DeCarla ................ 351/161 |

Primary Examiner—John K. Corbin
Assistant Examiner—Scott J. Sugarman
Attorney, Agent, or Firm—Donald M. Sell; Walter N. Kirn; Stephen W. Buckingham

[57] ABSTRACT

A multifocal ophthalmic lens has a plurality of concentric diffractive zones with adjacent zones separated by steps having predetermined heights. Each step has an outer corner and each outer corner has a radius of curvature equal to at least one half the height of the step associated therewith.

12 Claims, 1 Drawing Sheet

MULTIFOCAL DIFFRACTIVE LENS

FIELD OF THE INVENTION

The present invention relates to opthalmic lenses having a plurality of focal lengths.

BACKGROUND OF THE INVENTION

Bifocal spectacle lenses have been known for hundreds of years. In such lenses a first region of the lens is typically provided with a first focal length while a second region of the lens is provided with a second focal length. The user looks through the appropriate portion of the lens for viewing near or far objects.

In recent years as the popularity of contact lenses has grown, there has been an increased interest in multifocal contact lenses. Multifocal contact lenses utilizing an approach similar to that used in spectacle lenses are described in *Contact Lenses: A Textbook for Practitioner and Student*, Second Edition, Vol. 2 on pages 571 through 591. Such lenses have serious drawbacks, however, because they require that the lens shift on the eye so that different portions of the lens cover the pupil for distant and close vision. This design is disadvantageous because it is difficult to insure that the lens will shift properly on the eye for the desired range of vision.

In another design for a bifocal contact lens described in the above-referenced textbook, a central zone of the lens is provided with a first focal length and the region surrounding the central zone is provided with a second focal length. This design eliminates the necessity for shifting the lens by utilizing the phenomenon of simultaneous vision. Simultaneous vision makes use of the fact that light passing through the central zone will form an image at a first distance from the lens and light passing through the outer zone will form an image at a second distance from the lens. Only one of these image locations will fall on the retina and produce a properly-focused image, while the other image location will be either in front of or behind the retina. The human eye and brain will, to a great extent, work together to ignore the improperly-focused image. Thus the user of such a lens receives the subjective impression of a single, well-focused image. A disadvantage of such a lens is that, if the central zone is made large enough to provide sufficient illumination in its associated image location in low light situations, i.e., when the patient's pupil is dilated, the central zone will occupy all or most of the pupil area when the pupil contracts in a bright light situation. Thus bifocal operation is lost in bright light. Conversely if the central zone is made small enough to provide bifocal operation in bright light situations, an inadequate amount of light will be directed to the image location associated with the central zone in low light environments. Because the central zone is commonly used to provide distant vision, this can create a dangerous situation when the user of such a lens requires distant vision in low light situations such as when the user must drive a motor vehicle at night.

U.S. Pat. Nos. 4,210,391; 4,340,283; and 4,338,005, all issued to Cohen, teach the use of a plurality of annular regions that direct light to multiple foci and rely upon simultaneous vision to discard unfocused images. The annular zones are designed to provide the lens with a diffractive power. Typically a first focal length will be associated with a zero order diffracted light and a second focal length will be associated with the first order diffracted light.

In a typical prior art contact lens having diffractive power the various zones are separated by steps having an optical height equal to $\lambda/2$ where $\lambda$ is the design wavelength of light. The optical height is defined as $h/(n_1 - n_2)$ where h is the physical height, $n_1$ is the index of refraction of the lens and $n_2$ is the index of refraction of the surrounding medium, typically the tear fluid. The steps are usually made as sharp as possible in order to provide efficient diffraction. The use of such sharp steps, however, has two significant disadvantages. The first disadvantage is that sharp outer steps have been known to cause corneal damage known as staining and also scarring. The second is that deposits from the tear fluid components tend to accumulate in the inner corners of the steps. Furthermore such deposits are difficult to remove from the lens when the inner corner is sharp.

SUMMARY OF THE INVENTION

In the present invention a multi-focal ophthalmic lens has a plurality of concentric diffractive zones. Adjacent zones are separated by steps having predetermined heights. Each step has an outer corner and each outer corner has a radius of curvature equal to at least one half the height of the step associated therewith. Each step also has an inner corner and in some embodiments each inner corner has a radius of curvature equal to at least one half the height of the step associated therewith.

DETAILED DESCRIPTION OF THE PREFERRED EMBODIMENT

The present invention may be used in various types of ophthalmic lenses, such as contact lenses, intraocular lenses, intralamellar implants and artificial corneas. It has, however, the greatest benefits when used in conjunction with a contact lens and so will be described in that context.

Figure 1:
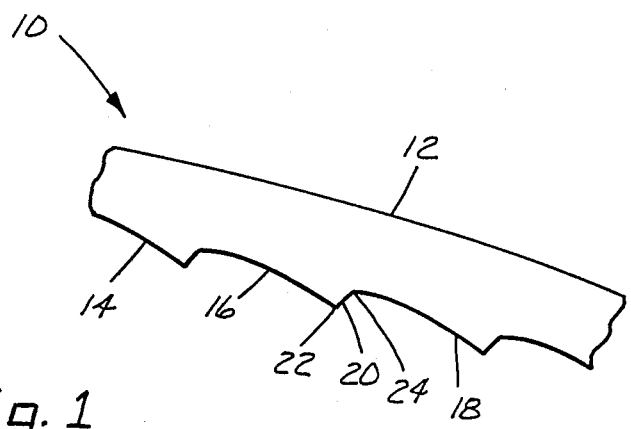
FIG. 1 is a cross-sectional view of a portion of a multi-focal contact lens having diffractive power according to the prior art.

FIG. 1 shows a portion of a cross-section of a typical diffractive bifocal contact lens of the prior art 10. Lens 10 has an anterior side 12 and a posterior side 14. Anterior side 12 is generally smooth while posterior side 14 is a structured surface. The structures on posterior surface 14 include a plurality of diffractive zones such as zone 16 and zone 18. These diffractive zones typically include a circular central zone surrounded by a plurality of concentric annular zones. Typically the diffractive zones, such as zones 16 and 18, are smoothly curving and are separated by steps such as step 20. Step 20 has outer corner 22 and inner corner 24. Generally practitioners in the prior art have believed that such corners should be made as sharp as possible. Thus typically an outer corner such as corner 22 will have no measurable radius of curvature while an inner corner such as corner 24 will have a radius of curvature dictated by that of the cutting tool used to form the structured surface.

Sharp corners 22 and 24 contribute significantly to two problems that have been common to diffractive bifocal contact lenses of the prior art. The first relates to sharp outer corners such as corner 22. Such sharp corners have been observed to cause damage to the cornea of users. This damage appears in the form of a disruption of the outer cellular layers of the cornea known as corneal staining.

The second problem of prior art diffractive bifocal contact lenses relates to a tendency of foreign matter to build up in the area near inner corner 24. The foreign matter may include airborne dirt or dust particles as well as protein or lipid deposits and other materials normally present in the tear fluid. These deposits tend to build up particularly in the region immediately adjacent the sharp inner corner 24, because the foreign matter tends to adhere well to that corner. Furthermore, due to the sharpness of the corner, it is difficult to force cleaning materials into the corner in order to clean such deposits from the lens.

Figure 2:
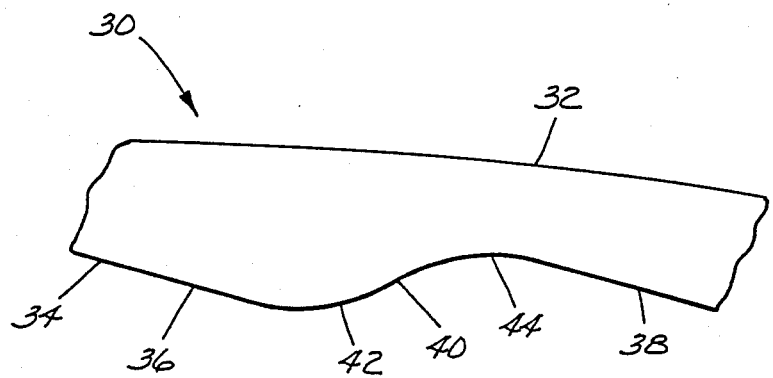
FIG. 2 is a cross-sectional view of a portion of a multi-focal contact lens having diffractive power according to the invention.

Contrary to the general belief of the prior art, however, investigation has shown that diffractive multifocal contact lenses can function reasonably efficiently when the step corners are intentionally made less sharp. FIG. 2 shows a cross section of a portion of a contact lens 30 according to the invention. Contact lens 30 has a smoothly-curving anterior surface 32 and a structured posterior surface 34. Posterior surface 34 includes a plurality of concentric annular zones such as zone 36 and zone 38 separated by steps such as step 40. Step 40 has an outer corner 42 and an inner corner 44, each of which has been given a radius of curvature greater than the minimum that could be achieved. In one embodiment the radius of curvature of corners 42 and 44 is one-half that of the height of optical step 40. The use of corners having such increased radii of curvature helps alleviate, or even eliminate, the previously described problems in the prior art. Since outer corner 42 is less sharp than outer corner 22 of FIG. 1, the likelihood of corneal abrasion is reduced. Similarly since inner corner 44 has an increased radius of curvature as compared with inner corner 24 of FIG. 1, the adherence of foreign matter to the corner is reduced. Furthermore, because inner corner 44 is less sharp, cleaning instruments will be more easily able to remove foreign matter that does accumulate.

In order to achieve the advantage of the invention a radius of curvature of at least one-half the step height should be used. As the radius of curvature increases beyond one-half of the step height the efficiency of the lens will be slightly reduced because light passing through the step will not normally be directed to either of the two foci. Because the step height is so small compared with the radii of the zones, however, the radius of curvature can be increased to as much as equal to the step height or even 1.5 or 2.0 times the step height without a noticeable loss of optical efficiency.

The exact radius of curvature that should be chosen for a particular lens will depend upon a number of factors. For example the design wavelength and the index of refraction of the lens material will affect the step height, and thus the required radius of curvature. The hardness of the lens will affect its tendency to cause corneal abrasion. Therefore, typically, a harder lens material would indicate that a larger radius of curvature on the outer step is required. Similarly a larger radius of curvature on the inner step will be required for lenses made of a material that has a greater tendency to adhere to proteins or other foreign material. Thus the optimum radii will necessarily be dependent upon a variety of factors. In general the radii of curvature should be at least one-half of the step height, but should be no greater than that which is required to obtain the present advantages.

We claim:

1. A multi-focal ophthalmic lens having diffractive power, said lens having a plurality of concentric diffractive zones, said zones being separated by steps, said steps having predetermined heights, each step having an outer corner and each outer corner having a radius of curvature equal to at least one half said height of its associated step.

2. The multi-focal ophthalmic lens of claim 1 wherein said lens is a contact lens.

3. The multi-focal ophthalmic lens of claim 1 wherein each outer corner has a radius of curvature equal to at least the height of its associated step.

4. The multi-focal ophthalmic lens of claim 3 wherein said lens is a contact lens.

5. The multi-focal ophthalmic lens of claim 3 wherein each outer corner has a radius of curvature equal to at least twice the height of its associated step.

6. The multi-focal ophthalmic lens of claim 5 wherein said lens is a contact lens.

7. The multi-focal ophthalmic lens of claim 1 wherein each step has an inner corner and each inner corner has a radius of curvature equal to at least one half of the height of its associated step.

8. The multi-focal ophthalmic lens of claim 7 wherein said lens is a contact lens.

9. The multi-focal contact lens of claim 8 wherein each inner corner has a radius of curvature equal to at least the height of its associated.

10. The multi-focal contact lens of claim 9 wherein each outer corner has a radius of curvature equal to at least the height of its associated step.

11. The multi-focal contact lens of claim 9 wherein each inner corner has a radius of curvature equal to at least twice the height of its associated.

12. The multi-focal contact lens of claim 11 wherein each outer corner has a radius of curvature equal to at least twice the height of its associated step.

* * * * *